INFORMATION DISPLAY SYSTEM

Filed Aug. 24, 1964 7 Sheets-Sheet 1

INVENTORS.
George W. Hernan,
Peter W. Beresin &
Eugene Gertler
BY Millman and Jacobs
ATTORNEY.

June 4, 1968 G. W. HERNAN ET AL 3,387,269

INFORMATION DISPLAY SYSTEM

Filed Aug. 24, 1964 7 Sheets-Sheet 2

INVENTOR.
George W. Hernan
Peter W. Beresin &
Eugene Gertler

BY Millman and Jacobs

ATTORNEYS

INFORMATION DISPLAY SYSTEM

Filed Aug. 24, 1964 7 Sheets-Sheet 3

INVENTORS.
George W. Hernan,
Peter W. Beresin &
Eugene Gertler
BY
Millman and Jacobs
ATTORNEY.

INVENTORS.
George W. Hernan,
Peter W. Beresin &
Eugene Gertler

BY

Mellman and Jacobs
ATTORNEY.

INFORMATION DISPLAY SYSTEM

Filed Aug. 24, 1964 7 Sheets-Sheet 5

INVENTOR.
George W. Hernan,
Peter W. Beresin &
Eugene Gertler

BY Millman and Jacobs

ATTORNEYS

INVENTORS
George W. Hernan,
Peter W. Beresin &
Eugene Gertler
BY
Milliman and Jacobs
ATTORNEYS INVENTORS.
George W. Hernan,
Peter W. Beresin &
Eugene Gertler
BY
Millman and Jacobs
ATTORNEY.

3,387,269
INFORMATION DISPLAY SYSTEM

George W. Hernan, Haddonfield, N.J., Peter W. Beresin, Philadelphia, Pa., and Eugene Gertler, Cinnaminson, N.J., assignors to Ultronic Systems Corporation, a corporation of Delaware Filed Aug. 24, 1964, Ser. No. 391,537
9 Claims. (Cl. 340—154)

ABSTRACT OF THE DISCLOSURE

In an electronic display system using segmental character display devices, particularly for stock quotations and the like, respective display devices have associated therewith a storage means for storing coded character signals and a bistable commutator register stage for controlling the storage of signals and blanking thereof. The signals are supplied in common to the storage means. The register stages are connected to preceding and succeeding stages to form a shift register. A display control unit responsive to character ready signals supplies shift pulses to the shift register and steers the first stage alternatively to storing and blanking states. Each register stage has means for sensing the state thereof. The control unit responds to blanking states at intermediate stages to steer the register to the storing state, and responds to a storing state at a later stage to change the steering to the blanking state. In a specific embodiment, stock quotations are displayed with identification in an upper row and quotations in a lower row. Stages are blanked ahead of a new quotation, and the start of a new quotation in the last seven stages is prevented by rapidly shifting the register to the initial condition. Redundant characters may be eliminated. The system allows the display board to be expanded as desired without changing the control thereof.

This invention relates to information display systems and particularly to a system using segmental display units and adapted for use with stock market ticker lines to display the stock or commodity quotations that are commonly supplied to stockbrokers offices by such lines.

Presently existing segmental display systems are constructed to display sequentially arriving characters in consecutive sequential display units across a display board. It is desirable in such display systems to have flexibility in choice of size of the display board and the number of display units without requiring a completely redesigned control unit for each size of display board that is provided. It is also desirable to have these display boards easy to repair without requiring removal of the entire display board, and to construct them compactly.

It is an object of this system to provide a new and improved ticker display system.

Another object is to provide a new and improved ticker display system which can be accommodated to different ticker transmission speeds.

Another object is to provide a ticker display system which is reliable and effective in operation.

Another object is to provide a new and improved display system which is easy to read and interpret.

Another object is to provide a ticker display system which has a high degree of interchangeability of parts for ease of repair.

Another object of the invention is to provide a display system in which the display board can be changed in size without the necessity of changing the display control.

Another object of the invention is to provide a display system which edits out redundant information.

Another object of the system is to provide a display system which affords optimum utilization of the space available for such a system.

In accordance with an embodiment of this invention, an all-electronic display system is provided. A row display is provided which has a plurality of modules that present as well as store the several characters which form successive words or messages, and each module includes an individual bistable commutator register stage that is readily interconnected with the individual commutator register stage of the remaining modules to form a shift register which controls the sequential presentation of the display.

The modules each comprise a pair of segmental display units of a plurality of segments that may be combinatorially energized to present any of the characters used in a message, such as a stock quotation. Electronic circuits are provided for registering characters from serially transmitted stock market ticker bits and for placing these characters in a suitable electrical form to operate display segments. The modules of the display row are successively operated under the control of the associated commutator register stages to present the successive characters of a stock quotation and to maintain display thereafter. A plurality of stock quotations may be stored in the row concurrently, and the modules are operated in a cycle, and their display is erased in advance to receive the next quotation.

The foregoing and other objects of this invention, the features thereof as well as the invention itself, may be more fully understood from the following description when read together with the accompanying drawing, in which.

In the drawing, corresponding parts are referred by similar numerals throughout.

Figure 1:
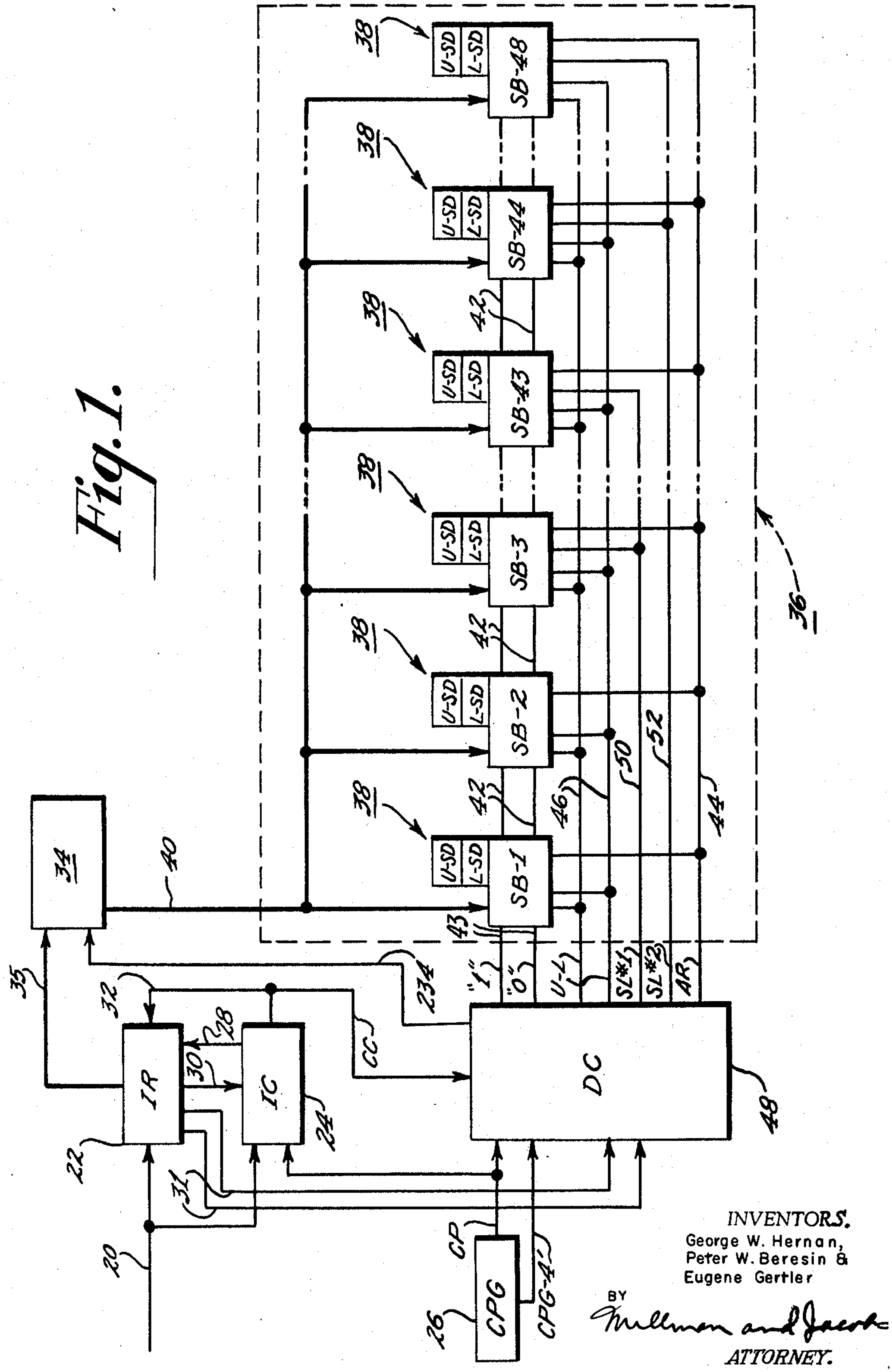
FIG. 1 is a schematic block diagram of a ticker display system embodying this invention.

In the overall system diagram of FIG. 1, the signals from the conventional telegraph ticker line 20 are supplied serially bit-by-bit to an input shift register (IR) 22 and also to an input control (IC) 24. A clock pulse generator CPG 26 supplies clock pulses to the input control 24 to establish the timing of the system. The input control 24 supplies pulses to the input register 22 via line 28 to establish successive ticker line bits in that register. When a full character is established in the register 22, the input control 24 recognizes this condition via line 30 and supplies a signal to the input register 22 via line 32 to transfer in parallel the signals established in said register 22 to a converter 34 via the parallel lines shown as a thick solid line 35.

The signals from the input register 22 which are supplied to the converter 34 are decoded from the standard 6-bit combinatorial code used by the ticker to a 14-bit segmental code for operating the 15 segments of the particular display unit that is used (two of the 15 segments are driven by the same one of the segmental code bits so that effectively only 14 individual segments are operated).

The portion of the system described thus far operates as the input section of the information display. An example of a suitable input section is shown in the copending application of Stanley H. Hunkins, Ser. No. 249,623, filed on Jan. 7, 1963.

In the aforementioned copending application, the input register is comprised of an 8-stage shift register with the first and eighth stages used to register the space and mark synchronization signals when a complete character is established in said register. The remaining six stages of the input register contain the six information bits of the standard 6-bit combinatorial code used for stock market ticker transmission, with the sixth bit being used as an information bit to indicate upper or lower case. Lines 31 in FIG. 1 are used to carry this sixth bit information from the sixth information stage of the input register to the display control 48.

A suitable clock pulse generator for CPG 26 is also disclosed in the aforementioned copending application. Therein it is shown that the clock pulse generator is comprised of a 5-stage binary counter with feedback from the output of the fifth to the second stage which is stepped by the pulses from an oscillator. The feedback from the fifth stage to the second stage of the binary counter enables CPG 26 to produce a clock pulse CP on the associated line upon receipt of thirty pulses from said oscillator rather than upon thirty-two pulses if there were no feedback. The CP pulse is generated by the fifth stage of said clock pulse generator. In addition, the output of the fourth stage of the CPG 26 is also used to provide timing pulses for the display control. These pulses are produced on line CPG–4 at twice the rate of CP.

A display board 36 (shown by broken lines) is comprised of a plurality of modules indicated generally at 38. Within each module is a storage board SB and two segmental display units SD labelled U–SD and L–SD which comprise said module. Although there are forty-eight of these modules 38 in the disclosed embodiment, it is to be understood that any desired greater or lesser number can be used. The 14-bit segmental code is supplied from the converter 34 to the display board via the bus of wires 40 which is connected in common to each of the modules 38.

The incoming segmental code is routed sequentially to successive modules by means of a commutator register stage in each of the storage boards, SB–1 to SB–48. The commutator stage in each of the storage boards is connected to the commutator stages in the previous and succeeding modules via lines 42 to form a commutator shift register. Lines 43, labelled "1" and "0," are steering inputs to the commutator stage of the first module. A series of three consecutive 1-bits are initially supplied on lines 43 by display control (DC) 48 and are shifted along the commutator register via lines 42 by means of advance pulses AR which are supplied from DC 48 on the advance register pulse line 44.

The commutator stage of each module 38 is adapted to be set to the 1-state upon the receipt of the first of the three shifted 1-bits, which state erases the previous character displayed in its associated segmental display units of the particular module. Following the three 1-bits, a string of 0-bits are supplied, the first of which resets each commutator stage to the 0-state when received. The change to the 0-state energizes gates within the associated module so that the new character which is present on bus 40 is displayed in the particular module.

As previously noted, each module contains a first and a second segmental display unit. The segmental display units are referred to as the upper (U–SD) and lower display (L–SD) units because of their physical location within the display board. The upper and lower segmental displays are operated selectively and alternatively by the form of the sixth bit of the 6-bit market ticker character. If a 1-bit is present in the sixth bit, the character is a lower display character; and if a 0-bit, an upper display character. The combinatorial segment signals on bus 40 representative of the character to be displayed operate the proper segmental display unit of the corresponding module 38 under control of the signals on the upper-lower control lines 46 which correspond to the said sixth input bit.

The display control DC–48 determines when the three 1-bits (which blank the previously stored information prior to establishing new characters for display in the display units) are inserted on line 43 to the serially connected commutator elements. The display control 48 operates in response to signals on two sense lines (SL #1 and #2) 50 and 52, respectively. The line 50 is the output of a multi-input AND gate which has an input diode from each of the commutator elements of SB–3 through SB–43 of the modules 38. Line 52 is the output of a multi-input AND gate which has a diode input from each of the commutator elements SB–44 through SB–48 of the display modules 38. The two lines 50 and 52 supply different signals corresponding to the location of the 1-bits in the commutator register and, thus, indicating the location of the module to receive the next character for display. Thereby, different control operations are initiated as described in detail hereinafter.

Figure 2:
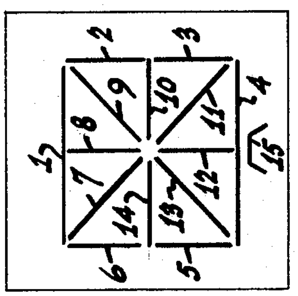
FIG. 2 is a schematic diagram of the face of a portion of a character section of the displays of FIG. 1.
Figure 3:
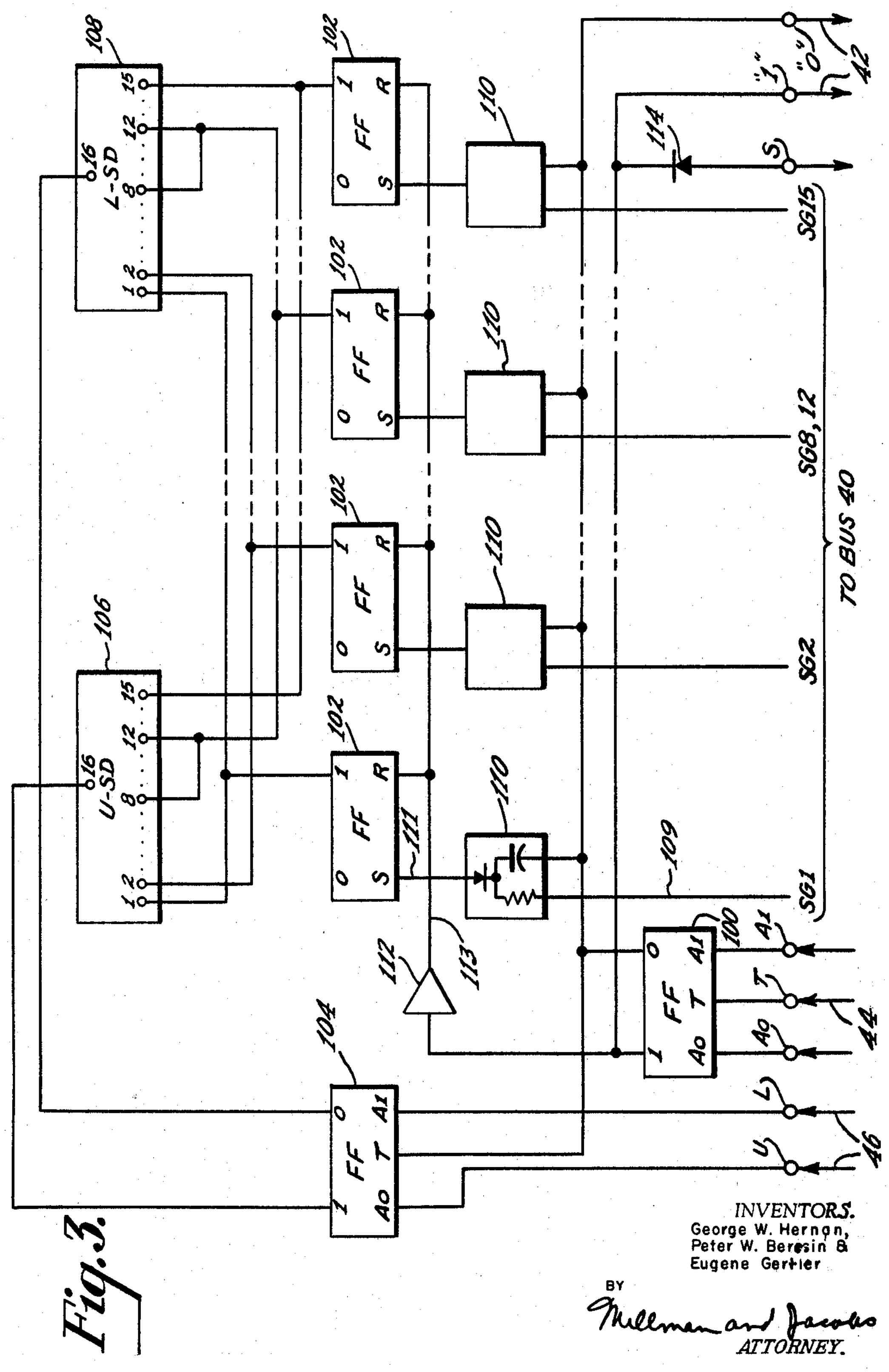
FIG. 3 is a schematic block diagram of the storage board associated with each character section of FIG. 1.

FIG. 2 illustrates schematically the face of one of the segmental display units. The segmental display unit used in this embodiment is a "Nixie" tube which is commercially available. As shown in FIG. 3, the tube 106 or 108 includes an envelope enclosing a gas, 15 cathodes and a common anode. The gas surrounding each cathode segment glows upon proper energization of the cathode and the anode. It is to be understood that this invention may be used with other segmental, monogram or mosaic display units. The face of the display is formed as a parallelogram with individual segments 1 and 4 for the top and bottom sides, pairs of segments 2, 3, and 5, 6 for the right and left sides, and radial segments 7 through 14 from the center to the side midpoints and corners of the parallelogram. In addition, the face of the display section includes a segment 15 which is the line under the parallelogram. By energizing suitable combinations of these segments, any desired numeric or alphabetic character may be formed (a single segment is formed of cathode segments 8 and 12, as shown in FIG. 3). This invention is not limited to any particular arrangement of segments or system of character formation.

As previously noted, each module contains two of these segmental display elements. The one placed on top is operated for alphabetic characters, and the display element placed on the bottom is operated for numerical characters and certain other characters, generally in accordance with the convention followed by the stock market ticker tape.

The storage board for each module 38 of FIG. 1 is shown in greater detail in FIG. 3. Each storage board SB–1 through SB–48 contains a commutator flip-flop 100, fourteen segment flip-flops 102, an upper-lower flip-flop 104, an upper segmental display 106, a lower segmental display 108, fourteen input gates 110, a reset amplifier 112, and a sensing diode 114.

Each storage board is of identical construction with the next and is in the form of a printed circuit board. The board is adapted to be plugged into connectors located in the display board. This identical construction of each storage board facilitates the substitution of one for another.

The commutator flip-flop 100 is connected at its input terminals A–0 and A–1 to the 1- and 0-outputs, respectively, of the commutator flip-flop of the previous storage board. The 1- and 0-outputs of said flip-flop 100 are in turn fed to the A–0 and A–1 inputs of the commutator flip-flop in the next succeeding storage board. Thus, in this manner the commutator flip-flops 100 of each of storage boards SB–1 through SB–48 form a 48-stage serially connected commutator shift register. Advance register shift pulses AR supplied on line 44 are applied at the trigger input (T) of all of the commutator flip-flops 100.

In operation, the commutator flip-flop 100 of each stage is normally in the 0-state. It is set to the 1-state upon reception of the first 1-bit and is reset to the 0-state after the third 1-bit is shifted out. Assuming that a previously inserted character is being stored and displayed in the storage board of a particular module, and that the steering from the preceding module in lines A–0 and A–1 is toward the 1-state, the following chain of events happens in routing a new character into the storage board. The next advance register pulse in line 44 changes the flip-flop 100 from the 0-state to the 1-state. This action causes a pulse to be sent through the reset amplifier 112 which resets all the segment flip-flops 102 via line 113 which in turn erases the previously stored character in both the segment flip-flops and in the associated display unit. The next advance register pulse leaves the commutator state unchanged because the steering inputs A–1 and A–0 have applied thereto voltages indicative of the second of the three 1-bits that are being shifted along the register. Upon the third advance register pulse, there is still no change of state as the third of the three 1-bits is inserted in FF–100. However, upon the fourth advance register pulse, the A–1 and A–0 inputs are steered by the 0-bit from the preceding commutator stage and thereby change FF–100 from the 1- to the 0-state. The change of voltage on the 0-output line of FF–100 is detected by gates 110 which are momentarily enabled to pass presently available segment input information from the segment-1 to segment-15 lines of the bus 40 to the respective associated segment flip-flops. Thus, if segment-1 is to be operated for the incoming character available on bus 40, the segment-1 input on line 109 enables gate 110 which sets the associated segment flip-flop 102 via line 111 which then stores the segment information for the display that is energized.

Whether or not the segments in the upper segmental display U–SD or the lower segmental display L–SD are operated is dependent on the nature of the incoming character. This is determined, as previously noted, by the sixth information bit of the market ticker input. The display control sends the proper signals on the upper and lower case input lines 46 to the storage board. These signals are used as steering inputs for the upper-lower flip-flop FF–104 which is also triggered by the 0-output of the FF–100, when the flip-flop changes from the 1- to 0-state, to select the upper or lower segmental display as determined by the steering inputs thereto.

The terminals 1 to 15 in the display tubes U–SD 106 and L–SD 108 are used as input terminals for the cathodes in each display tube, and the terminal 16 which is controlled by the associated output line of upper-lower flip-flop 104 is the anode terminal for the tube.

The diode 114 which is connected to the sense line S is part of an AND gate which is formed by a plurality of these diodes. The diode 114 in each of storage boards SB–3 through SB–43 form the inputs to sense line #1, SL #1, and the diode 114 in SB–44 through SB–48 comprise the inputs to sense line #2 (note FIGURES 1 and 4) SL #2. Thus, there is formed first and second plural input AND gates, the outputs of which are on sense line #1 and sense line #2 respectively. Although a diode 114 is provided in the first and second storage boards SB–1 and SB–2 for uniformity they are not connected to anything external of their respective storage boards.

As hereinbefore noted, the A–1 and A–0 inputs to the commutator of each module with the exception of the first module are received from the 0- and 1-outputs respectively of the commutator of the previous module. In the case of the first module, the A–1 and the A–0 inputs are taken directly from the display control which commences a new row of quotations by steering in proper voltages on the A–1 and A–0 inputs to represent the insertion of 1-bits during three successive advance register pulses. The advance register pulses shift along these three 1-bits through the end of the commutator register until the last stage (in SB–48) has received and shifted out the three 1-bits. The process is then repeated.

Figure 4:
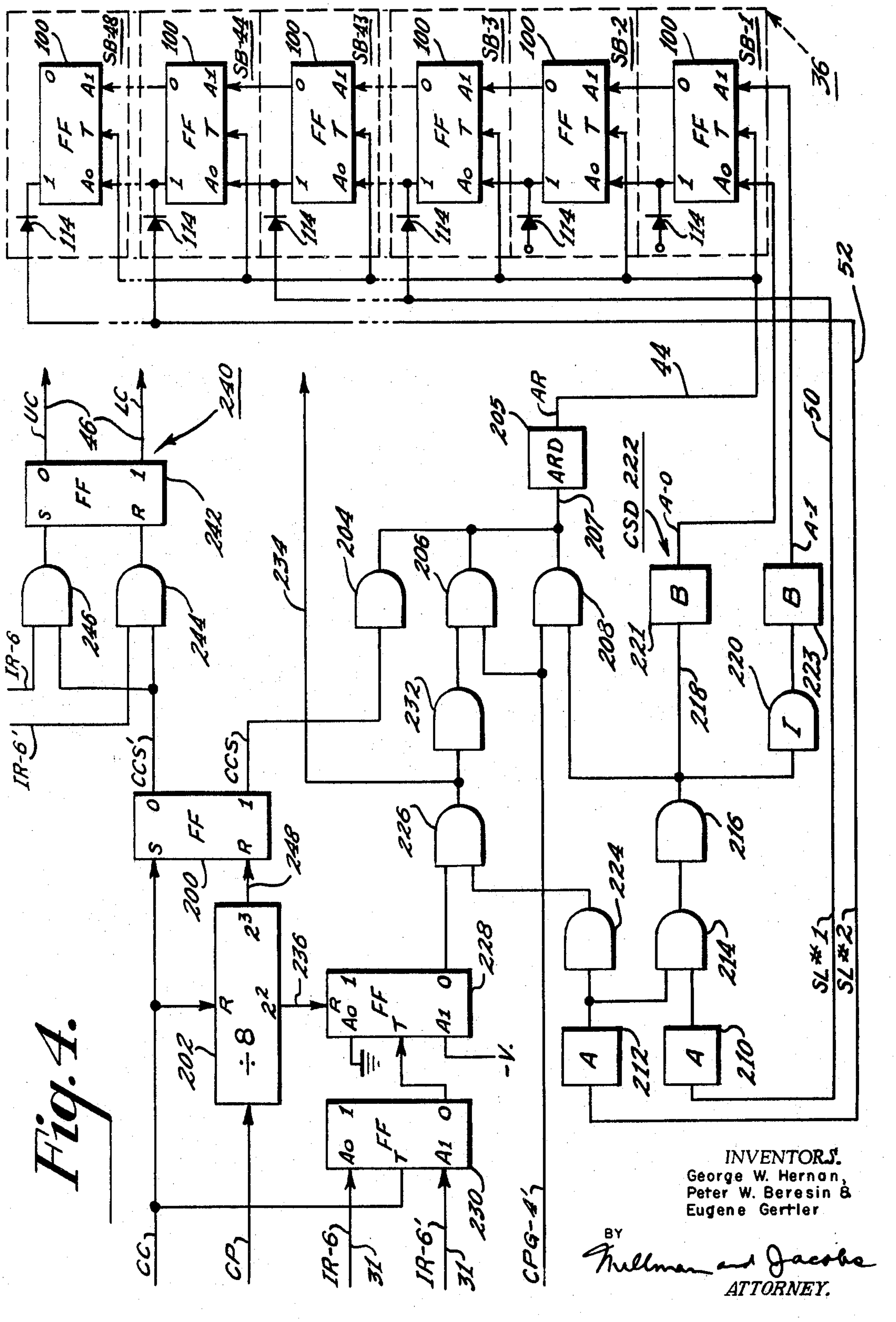
FIG. 4 is a schematic block diagram of the display control of FIG. 1.

The display control 48 is shown in detail in FIG. 4. As can be seen from the inputs CC, CP, CPG–4′, IR–6, and IR–6′, the display control is dependent for its timing and data on the input control logic. The display control is also dependent on the signals received from the display board 36 which are supplied via lines 50 and 52.

The character-complete CC pulse which is developed by the input control upon the completion of a charactered in the input register 22, shown in FIG. 1, is a pulse of a little less than one millisecond in duration. This is not a long enough pulse in which to complete the control logic due to the long time constants in the storage module and converter circuitry. Therefore, a stretched character-complete pulse CCS is generated to provide an ample control time interval.

Figure 5:
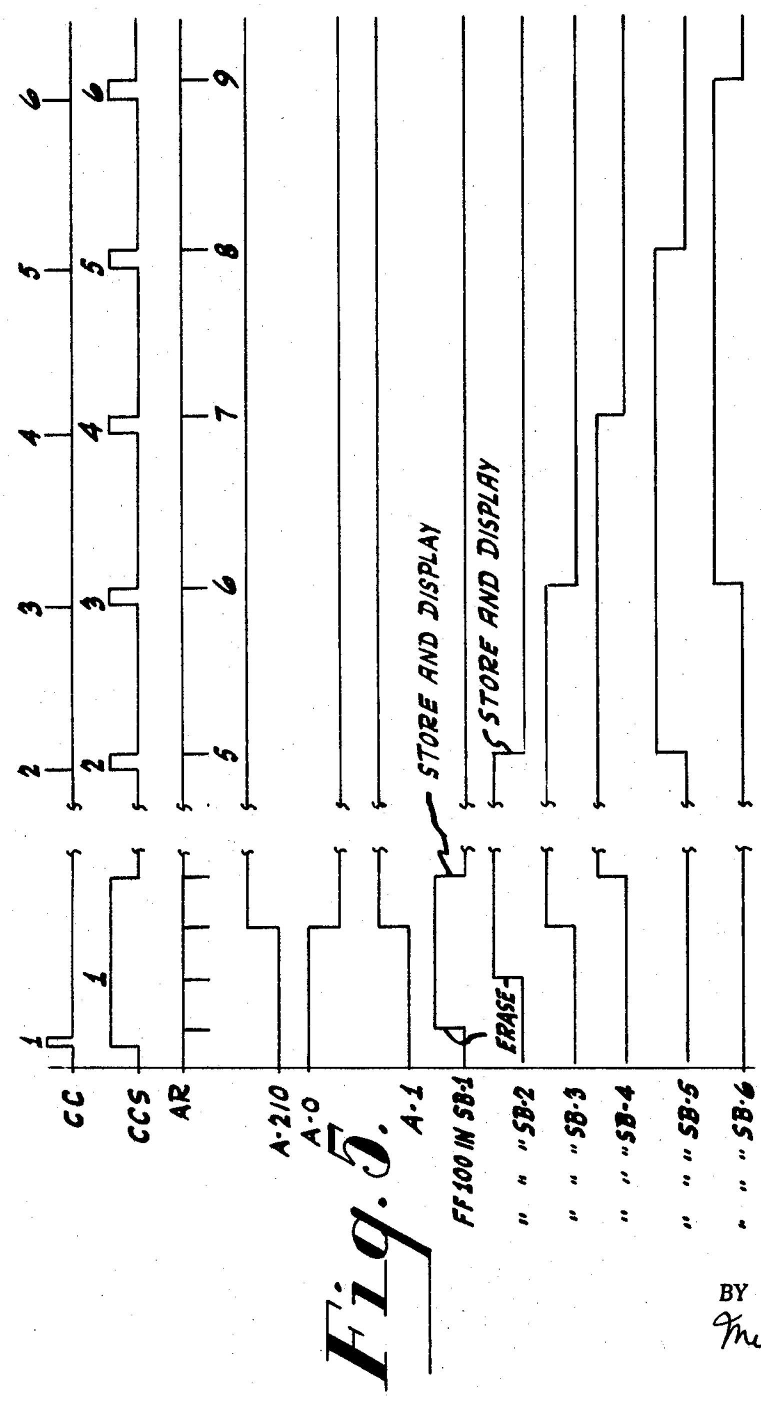
FIGS. 5 and 6 are idealized timing diagrams showing the sequence of operation of the various elements in the system of FIG. 1.

The character-complete CC input pulse in the display control can be seen in relationship to the stretched character-complete CCS pulse in FIG. 5. The stretched character-complete pulse CCS is generated in the display control in the following manner. The character-complete signal CC, when generated, sets flip-flop 200 which generates the stretched character-complete CCS pulse on its 1-output until it is reset by the output of the divide-by-8 counter 202. The divide-by-8 counter 202 is reset upon the setting of the flip-flop 200 by the CC pulse so that the flip-flop 200 is not reset until eight CP pulses come into the counter 202. The character-complete pulse CC is thus converted into the stretched character-complete signal CCS.

NOR gates are used throughout the description and are represented by the same symbol and may be of the type shown in copending application Ser. No. 149,913, filed Nov. 3, 1961 by George W. Hernan et al. If only one input is used, the module operates as an inverter. When two or more inputs are used, these modules function as NOR gates (i.e. a high output is produced only upon the concurrence of a low voltage applied to all of the inputs). The rectangular boxes labelled A, in addition to functioning logically as inverters, also function as an adapter to convert the voltage levels used in the display control. The rectangular boxes labelled B function logically as an inverter in addition to functioning as an adapter to convert the voltage levels used in the display control to a form usable in the display board 36. Inverter-amplifiers A and B are both well known amplifiers and take a form suitable for conversion of signals used in one system for use in another. The advance register driver ARD includes a single-shot multivibrator followed by an amplifier in order to produce pulses suitable for use in the display board. The flip-flops such as FF–200 in FIG. 4 are modules that are formed by a circuit that includes two cross-coupled NOR gates. Where triggered inputs T are used such as in FF–100 in FIGS. 3, 4, and 7, the flip-flop is a module which, includes a trigger circuit for steering a positive-going steering pulse applied to the T-input in accordance with the voltage levels applied to the A–1 and A–0 inputs.

The signal CCS which occurs upon the establishment of a new character in the input register is inverted by inverter 204, and the output thereof triggers ARD 205 whenever the output from 204 goes from low to high. The pulse output of ARD is a short duration low signal which is used as an advance register pulse AR to shift the contents of the commutator register which is formed by the commutator flip-flops 100 in each of the storage boards SB–1 through SB–48. The advance register pulses AR are developed whenever there is a change from a low voltage to a high voltage on the output line 207 from gates 204, 206 or 208. In addition to the AR pulses developed by the stretched character-complete CCS pulse, AR pulses are developed whenever a new quotation is to be started within the last seven storage board modules. These AR pulses are generated by clock pulses CPG–4′ routed through gate 206. Still further AR pulses are generated by clock pulses CPG–4′ routed through gate 208 upon the commencement of a new row of quotations.

The following description of the display control sequence of operations proceeds in conjunction with FIG. 5. In FIG. 5, the left-hand section is presented on a greatly expanded time scale in order to clearly show the sequence of operations during the first CCS pulse of a display cycle. The right-hand section represents the following time period of succeeding CCS pulses, and all CCS pulses are of substantially equal duration. In the initial condition, it is assumed that commutators in storage boards SB–1 through SB–48 are all in the 0-state. In this condition SL #1 and SL #2 are both high. Thus, the following events occur: A–210 and A–212 are low upon the sensing of high signals on SL #1 and SL #2, respectively. The low outputs from A–210 and –212 enable gate 214, whose high output is then fed through inverter 216, the low output of which enables gate 208 so that pulses from the 0-output of the fourth stage of CPG–26 (shown in FIG. 1) labelled CPG–4′ are passed to ARD–205. The low output from the inverter 216 is also fed to line 218 and to inverter 220 which serve as the inputs to the inverter-adapters B–221 and –223 which serve as the commutator steering driver CSD–222.

The output voltage line A–0 goes high, and the output voltage on line A–1 goes low as commutator steering drivers B–221 and –223 invert the inputs thereto. Thus, the first low pulse, CPG–4′, from the fourth stage of CPG–26 enables gate 208 to generate a high output which triggers ARD–205, which in turn generates the first advance pulse AR #1. The latter changes the state of FF–100 of storage board SB–1 to the 1-state due to the high and low voltages respectively on steering inputs A–0 and A–1. This equivalent to inserting a 1-bit into the first stage of the commutator register. Sense lines #1 and #2 both remain high because the inputs thereto from stages 3 through 48 in storage boards SB–3 through SB–48 remain high. The output diodes 114 of storage board SB–1 and storage board SB–2 are not used at all and are not fed to either of SL #1 or #2. Thus, the output of A–210 and –212 remain low, and consequently the output of gate 214 remains high, thereby enabling gate 208 to pass the next low pulse CPG–4′ from the fourth stage of CPG–26 in the form of a high pulse to ARD–205, which generates the second advance register pulse to shift again the contents of the commutator register. The low output from inverter 216 also keeps the outputs on the A–0 and A–1 lines high and low, respectively, thereby readying CSD–222 to insert another 1-bit in the commutator register upon AR #2. That is, AR #2 shifts the 1-bit from CSD–222 into FF–100 of SB–1 and also shifts the 1-bit from the FF–100 of SB–1 to FF–100 of SB–2. The commutator flip-flop FF–100 in each of the storage boards SB–1 and SB–2 is now in the 1-state as can be seen in FIG. 5.

Since the diodes 114 of each of SB–1 and SB–2 are not fed to either SL #1 or #2, these sense lines remain in their high voltage state, A–210 and –212 remain low and thereby enable the gate 208 via gates 214 and 216 to pass a third CPG–4′ to generate AR #3 via ARD–205. Since the A–0 and A–1 outputs of CSD–222 remain unchanged, a third 1-bit is shifted into the commutator register.

The shifting of a 1-bit into the third stage of the commutator register (i.e., FF–100 of SB–3) upon the third AR pulse, results in a low voltage being applied to diode 114 of SB–3 and passed to SL #1. This is inverted by A–210, and gate 214 is thus disabled. The output of inverter 216 goes high, changing the outputs A–1 and A–0 of CSD–222 to a high and low voltage, respectively. The high output of 216 also closes gate 208 to pulses CPG–4′. The 1-bit in each of commutator stages–1 through –3 effectively erases any characters that had been displayed therein previously.

Upon the completion of the first stretched character-complete pulse CCS, inverter 204 triggers ARD–205 which generates AR #4, and thereupon, the first character from IR–22 is available in segmental form on bus 40. Since the A–1 and A–0 outputs of CSD–222 have become high and low, respectively, AR #4 simultaneously changes the state of FF–100 in SB–1 from the 1- to the 0-state, and FF–100 in SB–4 from the 0- to the 1-state. Changing of a commutator flip-flop from the 1- to the 0-state enables gates 110 in the associated storage board to pass the segmental signals that are available on the bus 40 to the segmental flip-flops FF–102. Thus, the first storage board SB–1 accepts for display the character available in segmental form on the bus 40 (which is the first character that is established in input register 22) and simultaneously, the previously displayed character in SB–4 is erased. This can be seen graphically in FIG. 5 wherein the trailing edge of the first CCS pulse and the fourth advance register pulse AR #4 coincide with the end of the 1-state of FF–100 in SB–1 and the beginning of the 1-state of FF–100 in SB–4.

Successive AR pulses are generated in a similar fashion from CCS pulses applied via inverter gate 204 to AR–205 upon establishment of each new character in input register 22. A precession of the three 1-bits advances then from FF–100 in SB–4 through FF–100 in SB–43. Thus, when the AR #4, AR #5, AR #6 and AR #7 through AR #43 advance register pulses are applied to the commutator register, the storage boards SB–4, SB–5, SB–6 and SB–7 through SB–43 successively erase the corresponding storage boards. Storage boards SB–1 through SB–40, respectively, are successively enabled to display successively the first through fortieth characters available on bus 40.

After AR #44 has shifted the first of the three 1-bits to the FF–100 of SB–44, the display control senses the occurrence of any new quotation and prevents its starting within the last seven modules of the display board 36. This is performed in the manner described below.

Upon application of pulse AR #44 to the commutator register, FF–100 of SB–44 changes to the 1-state. This allows the voltage on SL #2 to go low as diode 114 of SB–44 is forward-biased by the low voltage applied thereto by the 1-output of FF–100. When SL #2 goes low, the signal is applied via inverters A–212 and –224 to enable gate 226 to pass a low output from the 0-output of FF–228 when it is set. FF–230 triggers FF–228 upon being triggered by pulse CC and the detection of a 0-bit in the sixth stage of the input character register 22, which is manifested by a high and low voltage on input lines IR–6 and IR–6′, respectively, of FF–230. Thus, upon the detection of that 0-bit in the sixth stage of IR–22 (corresponding to the beginning of a new quotation) after SL #2 has gone low as a result of the pulse AR #44 shifting a 1-bit into SB–44, gate 226 passes a signal via inverter 232 to enable gate 206 to pass successive low pulses CPG–4′ as they are generated. The pulse outputs of gate 206 generate a succession of advance register pulses AR via ARD–205 which result in a faster precession of the 1-bits through the commutator register so that the new quotation is displayed in the first module of the display board 36 rather than the last seven modules of the display board. A splitting of the quotation in two parts at the end and beginning of the display board is thereby prevented. During the fast procession of the three 1-bits through the last seven stages of the commutator register, the character for display is not available on the bus 40 because the output of gate 226 is applied to the converter 34 via line 234 and logically inhibits the output lines therefrom leading to the bus 40. Consequently, the signals applied to the bus 40 are representative of a blank character which is displayed in each of the remaining modules of the display board.

Figure 6:
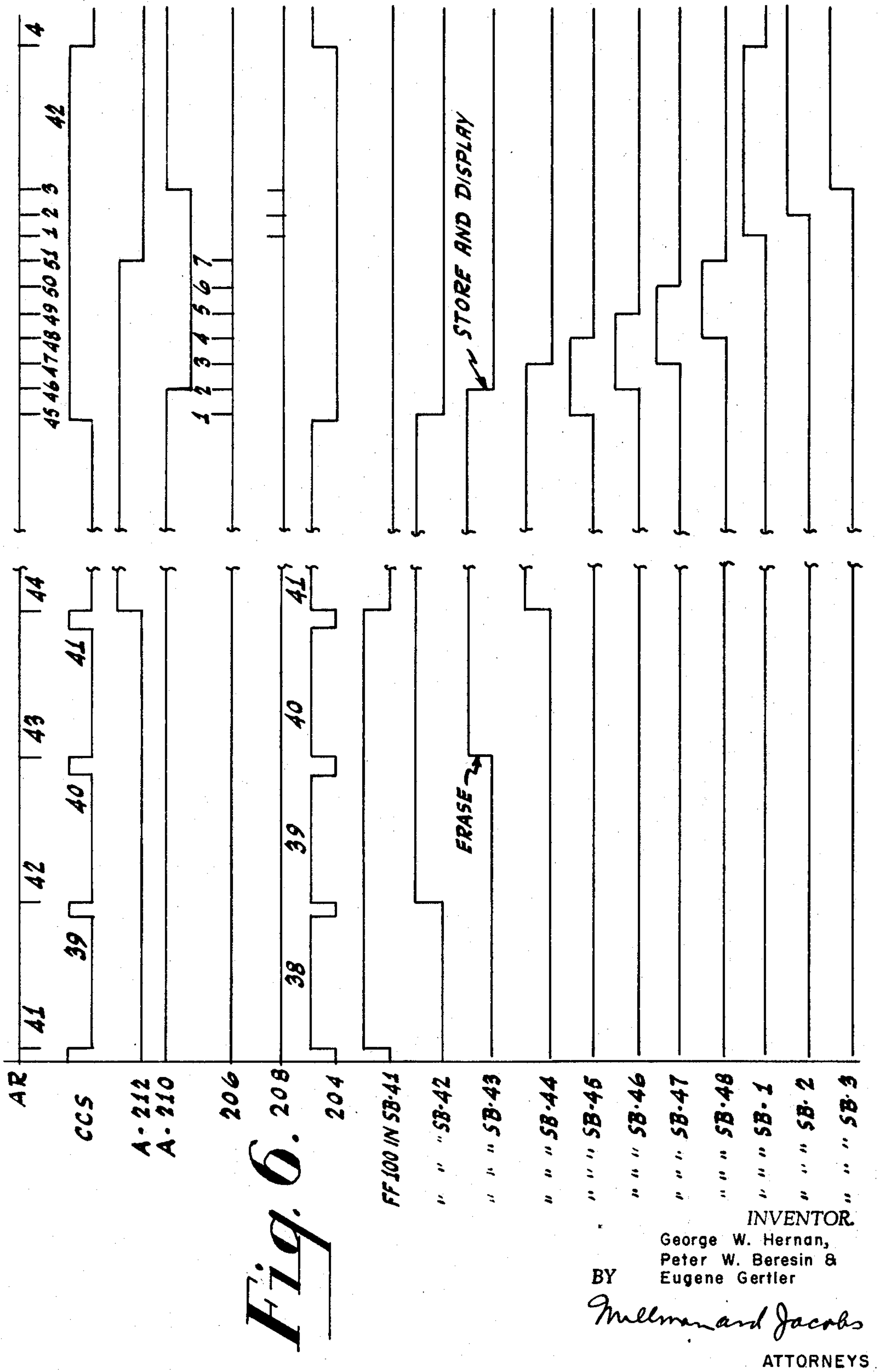

The following example, described in conjunction with FIG. 6 which is a diagrammatic timing diagram of the sequence of operations in the display control, illustrates the operation of the last-seven logic. Upon AR #41, which is generated by the edge of the thirty-eighth CCS pulse, the character in SB–41 is erased as the associated FF–100 is changed to the 1-state, and concurrently, the character available on bus 40 is displayed by SB–38 as its associated FF–100 is changed to the 0-state. Upon AR #42, the previous character in SB–42 is erased, and the character available on bus 40 is displayed in SB–39. Likewise, when AR #43 triggers FF–100 in SB–43 to the 1-state, the previous character stored in SB–43 is erased, and concurrently, the storage board SB–40 displays the new character available on bus 40. Upon AR #44, FF–100 in SB–44 is triggered to the 1-state, and SB–41 displays the character available on the bus 40. The change of state of FF–100 in SB–44 causes SL #2 to go low as the diode 114 in that board is forward-biased, thereby enabling the output of A–212 to go high. The high output from A–212 is inverted by gate 224 to a low output which enables gate 226 to pass a negative-going pulse from FF–228, upon being triggered by FF–230. The triggering occurs whenever there is a change from a lower case character to an upper case character, which is the case whenever a new quotation begins.

Assuming that the forty-first character had been a lower case character, and the next character is an upper case display character, the following chain of events occurs: FF–228 is triggered by the change of state of FF–230, which is switched upon detection of a 0-bit in the sixth stage of IR–22 and concurrent triggering by the forty-second CC pulse. Thus, the low output from the 0-output of FF–228 enables the output of gate 226 to go high. This high output is transmitted to the converter 34 via output line 234 in order to blank the segments on the bus 40. The low output from inverter 232 enables gate 206 to pass the low output pulses CPG–4′.

In FIG. 6, the right-hand section is presented on a greatly expanded time scale in order to more clearly show the sequence of operations during the time that the forty-second CCS pulse is high. It should be understood, however, that the time elapsed between the leading and trailing edge of the forty-second CCS pulse is the same as the time elapsed during each of the other CCS pulses.

It should be remembered that the CCS pulse goes high upon the occurrence of the CC pulse from the input control 24. Thus, when the forty-second character is established in IR–22, the forty-second CC pulse sets FF–200 which produces a high CCS pulse and concurrently triggers FF–230, which changes state upon detecting that the forty-second character is an upper case display character. As can be seen in FIG. 6, AR #45 is produced by a CPG–4 pulse during the forty-second CCS pulse, and it advances the leading 1-bit of the three 1-bits in the commutator register to FF–100 of SB–45. There is, however, no concurrent display in SB–42 because the signal on line 234 from gate 226 has logically blanked the output segments from the converter 34. AR #46 is next produced during the forty-second CCS pulse and as a result of the second high output from gate 206, and it shifts the leading 1-bit into FF–100 of SB–46 which erases any previously stored character therein. There is no new display in SB–43 because the segmental information from converter 34 to the bus 40 remains a blank. AR #47 causes the previous information, if any, in storage board SB–47 to be erased, and again, there is no display in SB–44 because the segmental information on bus 40 remains in a state indicative of a blank. Likewise, the AR #48 is generated as a result of the fourth pulse output from gate 206. AR #48 erases the previous contents, if any, in SB–48, and SB–45 displays a blank as the bus 40 remains in the same state. AR #49, #50 and #51 are produced as a result of the fifth through seventh pulse outputs on gate 206. These pulses cause the three 1-bits in the commutator register to be shifted out of the commutator register, and the display in SB–46, SB–47, and SB–48 receive no new character from the bus 40 as the converter output remains indicative of a blank.

Upon AR #51, FF–100 of SB–48 changes from the 1- to the 0-state, thereby resulting in SL #2 going high. When SL #2 goes high, A–212 produces a low output which is inverted to a high output by inverter 224 which disables gate 226, which terminates the generation of AR pulses via gate 206.

After AR #51, the disabling of gate 226 terminates the generation of AR pulses via gate 206. However, A–210 has a low output because SL #1 is high, which combines with the low output of A–212 to enable gate 214, and thereby enable gate 208 via inverter 216 to pass the next successive low pulses CPG–4′. The CSD–222 outputs A–0 and A–1 are also changed upon the enabling of gate 214, and a high and a low voltage are produced on the outputs A–0 and A–1, respectively. Thus, upon the next AR pulse, which is produced as a result of the first high output from gate 208, a 1-bit is inserted into FF–100 of SB–1, the first stage of the commutator register. This pulse is labelled AR #1. As will be remembered from the earlier discussion of the display control unit, the next pulse AR #2 shifts the 1-bit from the first stage of the commutator register to FF–100 of SB–2 and another 1-bit is inserted into FF–100 of SB–1. AR #3 shifts the 1-bits from the first two stages in SB–1 and SB–2 into the second and third stages, respectively, and a third 1-bit is put into FF–100 of SB–1 by CSD–222. AR #3, as it changes the state of FF–100 in SB–3 to the 1-state, thereby causes SL #1 to go low, which produces a high output on the output of A–210. The latter, in turn, disables gate 208 via gate 214, which terminates the generation of AR pulses via that path.

When the CCS pulse terminates, its trailing edge is inverted by gate 204, the high output therefrom triggers ARD–205 to generate AR #4 which results in a display of the forty-second charatcer in SB–1, and the display cycle is thereby repeated in the manner hereinbefore described.

It can thus be seen that if a new quotation starts between the forty-first and forty-second CCS pulses which were produced by the CC pulse for the forty-first and forty-second characters, the following events occur. The display of the new quotation within the last seven storage boards is prevented. Any information previously stored within the last seven storage boards is erased, and the first three stages of the display board are also erased. The first character of the new quotation is then stored in SB–1 and displayed in the associated segmental display.

These multiple functions can be produced because of the relatively high rate of the CP and CPG–4′ pulses with respect to the input bit rate on the ticker line. A ticker line character of eight bits is 120 milliseconds (ms.) in duration. The CP pulses are produced at a little less than 1 ms. intervals. A CCS pulse which is a duration of eight CP pulses is approximately 7.5 ms. in duration. Thus, since pulses 45 through 51 are generated within the 7.5 ms. duration of the CCS, there is more than ample time to route the display of the first character of the new quotation to the beginning of the display board. It can also be seen that in view of the small portion of time used of a character length, this system can accommodate much higher bit rates.

FF–228 is rest by the pulse on line 236 as a result of an output from the second stage of the three-stage divide-by-eight counter 202 which is generated on the fourth CP pulse after a CC pulse resets said counter. FF–228 is reset by counter 202 to prevent the enabling of gate 206 by CPG–4′ pulses when the output of A–212 goes high and a new quotation has not been started within the last seven modules. For instance, if a new quotation begins in the fortieth storage board SB–40, the fortieth CC pulse triggers FF–230 which sets FF–228. At this time, SL #2 is high, and A–212 supplies a signal via inverter 224 to disable gate 226, and no extra AR pulses are generated. Thereafter, at the middle of the character time, FF–228 is reset and remains reset for the remainder of the quotation since it is only the transition to upper case which produces the positive-going pulse at the 0-output of FF–230 that is effective to trigger FF–228. Consequently, the last-seven logic is not initiated, and successive characters of the quotations are handled and displayed in the normal fashion.

However, upon termination of the quotation within the last seven positions, the beginning of a new quotation will set FF–228 via FF–230. At this time SL #2 will be low, as described above. Consequently gate 226 will be actuated to enable gate 206 to pass CPG–4′ pulses, and the remaining board positions will be erased. The first three positions will also be erased by pulses through gate 208, as described above, and the new quotation will start at the first position.

The display control also contains an upper and lower control circuit 240. This circuit is comprised of FF–242 which is driven by two gates 244 and 246 that receive IR–6′ and IR–6, respectively, and CCS′. The upper-lower control circuit determines whether the upper or lower segmental display is used. The operation of the upper-lower control circuit is as follows. When there is a 0-bit in the sixth stage of the IR–22, it indicates that there is an upper case character established in IR–22. When there is a 0-bit in the sixth stage, the IR–6 input is high, and the IR–6′ input is low. This resets FF–242, thereby putting a high output on the upper case (UC) output line. Conversely, when there is a 1-bit in the sixth stage of IR–22, this connotes a lower case character established in the input register. Thus, the IR–6 input line goes low, enabling gate 246 to pass the low output from the 0-output of flip-flop 200, which sets FF–242, which in turn generates a high output on the lower case (LC) line.

Thus, the display system routes sequentially arriving characters to successive modules of a display board for display thereon. The characters are steered to the proper module by a commutator register which is comprised of a commutator element from each of the modules, which elements are connected together serially. Because each module contains a stage of the commutator register, the length of the display board can be changed merely by adding or taking away modules. The system for sensing the state of the commutator register is also arranged on a modular basis. That is, AND gates are formed of a plurality of diodes with one from each commutator stage. These sensing AND gates together with appropriate controls ensure proper erasure of old information as new information is laid down, and, when the display is completed, ensure that a new cycle is started from the beginning.

The steering of characters to the proper module is performed by shifting a series of three 1-bits through the commutator register. The leading 1-bit causes the prior character stored and displayed in the module to be erased, while the trailing 1-bit enables the module to store and display the next character. Thus, the effect of the three 1-bits processing through the commutator register is to produce a blank in three modules at a time processing across the display board followed by a new display of characters. This feature enables all of the characters on the board to be displayed for substantially an equal length of time.

Moreover, since the modules are of similar construction, the manufacturing costs of the system are greatly reduced. Further, the similarity of the modules facilitates replacement of parts of the system.

The display board which displays simultaneously a row of characters enhances its value as a display medium by being easy to read as well as easy to interpret. Moreover, because of the last-seven logic in the display control, a new market quotation cannot begin within the last seven modules, thereby minimizing quotation splitting which would otherwise produce the start of a quotation on the right end of the display board and the finish of the quotation at the left end.

The display control, because it is dependent on its timing from the input rate of characters to the input system, can accommodate different ticker rates. This invention is not limited to market ticker quotations nor to alphanumeric display systems, and in principle may be used for the display of any information unit supplied at any character rate. Moreover, as is described below in conjunction with FIG. 8, redundant information can be disregarded. That is, where an information unit is repeatedly sent for other than information transmittal, it is detected and discarded by the display control before it is displayed on the storage board.

Figure 7:
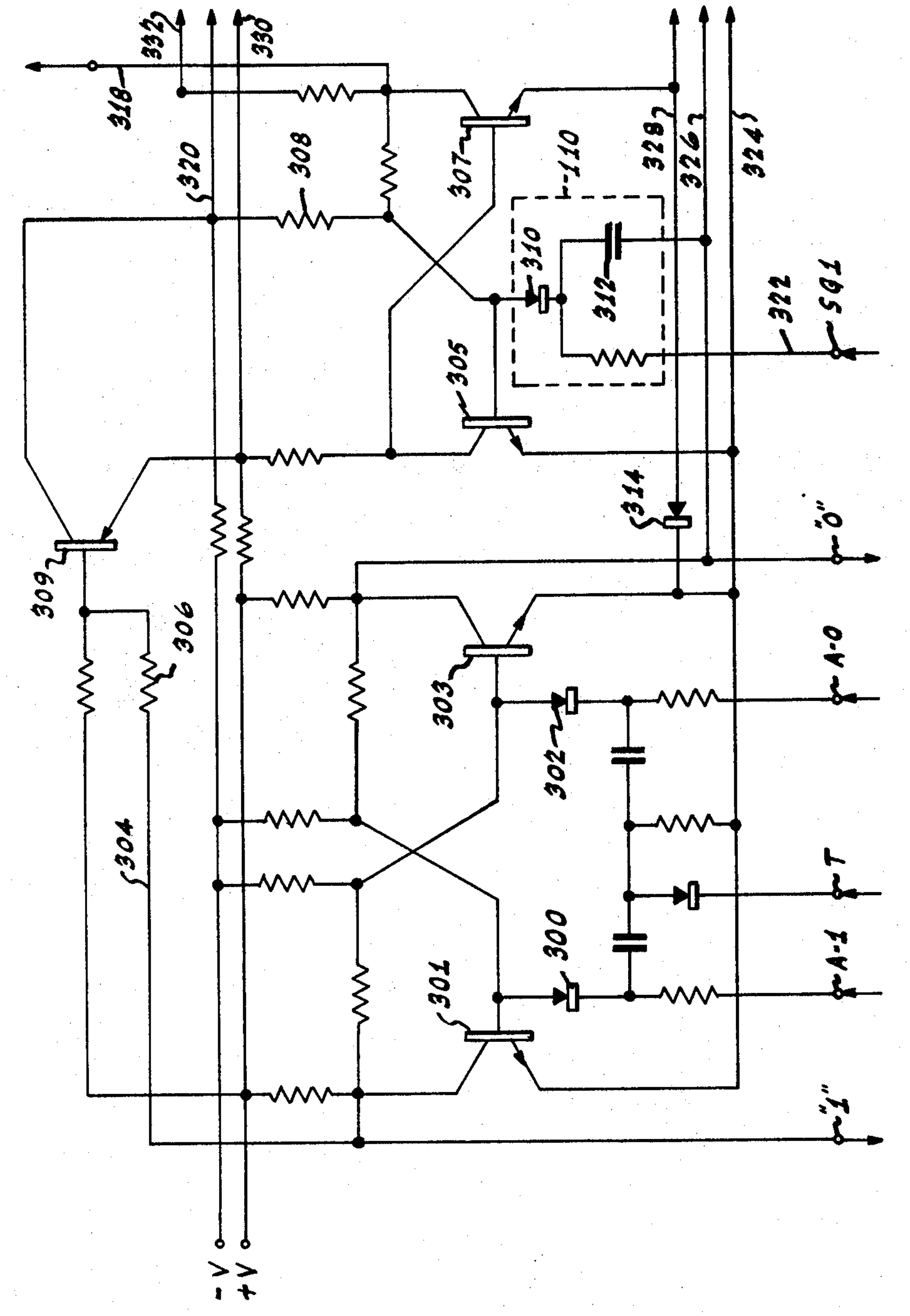
FIG. 7 is a schematic circuit diagram of a commutator flip-flop, a segment flip-flop, an input gate and reset amplifier of the storage board of FIG. 3.

In FIG. 7 there is shown a schematic circuit diagram of the commutator flip-flop, one of the segment flip-flops, and the reset amplifier as they are connected in each of the storage boards. Each commutator flip-flop 100 is comprised of two transistors 301 and 303, cross-coupled to operate as a bistable device with steered inputs, A–1 and A–0, and a trigger input T. As was previously noted, in conjunction with FIG. 3, the commutating flip-flop is normally in the 0-state. In this state, transistor 303 is conducting, and transistor 301 is cut off; the voltage on the output of the collector of transistor 301 is high, and the output on the collector of transistor 303 is low. If there is generated a high voltage on A–1 and a low voltage on A–0, then diode 300 is heavily back-biased, and diode 302 is approximately zero-biased. In this condition, a negative AR pulse coming in on the T-input forward-biases diode 302 which turns off transistor 303 and switches the flip-flop to the 1-state. So long as the inputs A–1 and A–0 are high and low, respectively, any subsequent low pulses on the trigger input T leaves the 1-state of the flip-flop unchanged. However, if A–1 and A–0 are placed in a low voltage and high voltage state, respectively, the next trigger pulse changes the state of the flip-flop from the 1- to the 0-state; and the output on the collector of transistor 303 which goes from a high to a low voltage is used as a triggering input for all of the segment flip-flops via line 326.

The reset amplifier is comprised of transistor 309 and its associated circuitry. The transistor 301 of the commutator flip-flop is connected to the base of transistor 309 via line 304 and resistor 306. When the commutator flip-flop is in the 0-state, the transistor 309 is cut off by the positive voltage on its base due to the high voltage across resistor 306 from the output of the collector of transistor 301. When the commutator flip-flop is in the 1-state, the output voltage on the collector of 301 goes low, thereby reducing the voltage across resistor 306 and the base of transistor 309. The transistor 309 voltage on its collector is negative when it is cut off. However, when it is turned on, the collector goes to a corresponding positive voltage. Thus, the reset amplifier 309 is controlled by the commutating flip-flop. It is cut off when the commutating flip-flop is in the 0-state, and it conducts or is turned on when the commutating flip-flop is in the 1-state.

Transistors 305 and 307 and their associated circuitry comprise the first segment flip-flop, the output of which controls the first cathode terminal of the upper and lower segmental display units.

Since each of the segment flip-flops are identical in operation, only this first segment flip-flop is shown and described herein. When the transistor 305 is conducting, the flip-flop is considered to be in the 0-state. When the transistor 307 is conducting, the flip-flop is considered to be in the 1-state; and, the associated segment of the segmental display is illuminated.

The circuit operates as follows: Assuming that an AR pulse has just occurred and triggered the commutator flip-flop to the 1-state, the reset amplifier is switched on because of the low voltage applied to the base of transistor 309. The positive voltage from the collector output of transistor 309 is applied to the base of transistor 305 via resistor 308, and the transistor 305 is made conductive. As a result, the segment flip-flop is now in the 0-state, and the previous segmental illumination, if any, is turned off.

In an identical manner, each of the other segment flip-flops are changed to the 0-state via the line 320 which is connected to the other segment flip-flops in the same manner as it is to the segment flip-flop shown. Since the transistors 305 and 307 are high voltage transistors, the voltage across the collector of 307 is now very high. Therefore, it is able to hold off the illumination of a segment in the segmental display unit by placing a high voltage on the first cathode of the segmental display that is used via line 318. Assuming that a segment is to be illuminated, the input to the segment–1 (SG–1) input 322 is at ground potential. The next advance register pulse triggers the commutating flip-flop to the 0-state if the inputs to A–1 and A–0 are low and high, respectively. The resetting of the commutating flip-flop in turn cuts off the reset amplifier. The voltage across the output collector of transistor 303 goes from high to low, thereby triggering the segment flip-flop via the capacitor 312 of input gate 110 which discharges in a direction away from the diode 310 which is forward-biased. This cuts off transistor 305 and thereby turns on transistor 307. With transistor 307 conducting, the voltage across the collector drops, thereby lowering the associated cathode voltage and illuminating the segment–1 of the associated segmental display unit.

As previously noted, the segment flip-flop shown is exactly like all the other segment flip-flops 2 through 14. As can be seen in the figure, the segment flip-flop is unbalanced in that there is no resistance provided between the output of the collector 305 and the base of the transistor 307. However, a resistance between these two points is unnecessary because of the emitter-bias provided by the silicon diode 314. It should also be noted that each of the segment flip-flops are operated simultaneously. In this respect, the lines 320, 324, 326, 328, 330 and 332 are connected to each of the segment flip-flops in the same manner as they are connected to the segment flip-flop shown herein.

Figure 8:
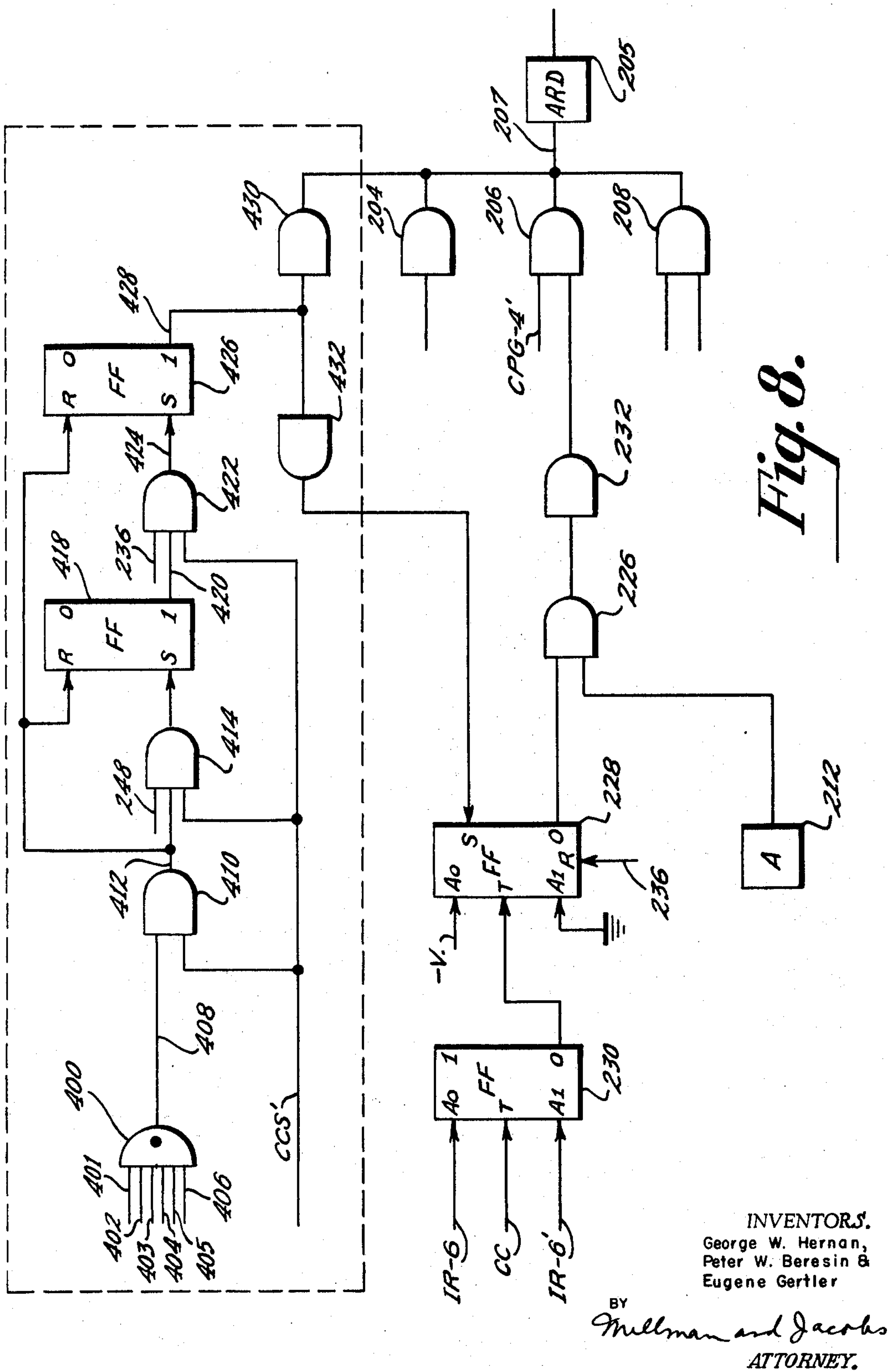
FIG. 8 is a schematic block diagram of a dot eliminator control which can be used with the display control of FIG. 4.

FIG. 8 shows the "dot eliminator" addition to the display control. That which is added to the display control in FIG. 4 is enclosed by dotted lines. This addition to the display control is provided to display the ticker information from the Chicago Board of Trade ticker line. Since the Chicago Board of Trade ticker line does not provide a continuous series of quotations, the provision of a dot, or series of dots, is transmitted after the last ticker quotation. This results in a series of dots displayed across the entire display board with no information showing. To counteract a display of only dots on the board, the equipment of FIG. 8 is provided to modify the operation of the display control shown in FIG. 4. The manner in which the "dot eliminator" operates to correct the previously noted condition is as follows: The dot eliminator allows the first two dots to be displayed and then prevents further routing of dots to the next successive display units of the display control board. Thus, the remaining series of dots are eliminated.

A dot is represented by the character 000010. The sixth bit, which is a zero, indicates that it is an upper case character. A dot is detected by a dot recognition gate 400. The dot recognition gate 400, in one embodiment, takes the form of a six-input AND gate which has connected to its inputs 401 to 404 and 406, the 1-outputs of the first second, third, fourth, and sixth stages of the input register 22; and, to input 405 is connected the 0-output of the fifth stage of the input register. In another form, the dot recognition may be responsive to the converter 34 which also provides the necessary information to detect a character representative of a dot.

The output of DRG 400 goes high upon the recognition of a character representative of a dot in the input register 22, and upon the reception of the first such dot, gate 410 is disabled. The output of gate 410 then goes low, and the CCS' pulse, which goes low upon establishment of a new character in the input character register 22, combined with a low signal on line 248 (near the end of CCS'), enables gate 414, the output of which goes high and sets FF–418. When FF–418 is set, the 1-output on line 420 is changed from a high to a low voltage output. By the time that the output on line 420 goes low, a low pulse on line 236 from the divide-by-eight counter 202 (at the middle of CCS') has terminated and gate 422 remains disabled. Upon the reception of a second consecutive dot, the dot recognition gate 400 is again enabled, and the output on line 408 is again high. The gate 410 remains disabled, and the output on line 412 remains low. The conditions of gate 414 and FF–418 remain the same, and the low pulse on the CCS' line combined with a low signal on line 236 enables gate 422 which puts a high output on line 424, which, in turn, sets FF–426. The output of FF–426 on line 428 goes low, and is inverted to a high output by inverter 430 which is connected to ARD–205 via line 207. Thus, as long as dots are detected by the dot recognition gate 400, the output of FF–426 on line 428 remains low, thereby producing a continuous high output from gate 430 on line 207. ARD–205 produces an advance register pulse upon the change from a low voltage to a high voltage on line 207. Since line 207 remains constantly high as long as dots after the second are detected by gate 400, the generation of advance register pulses by the transient of a low to high voltage on line 207 from the outputs of gate 204, 206, or 208 is interrupted until such time as a new character other than a dot is detected in input register 22. This occurrence causes DRG–400 to be disabled. The output thereof goes low, thereby enabling NOR gate 410 and producing a high output on line 412 when CCS' goes low. This action resets FF–418 and FF–426, causing the voltage on line 428 to go high and the output from inverter 430 to go low, which removes the inhibition on the generation of advance register pulses. This ability to edit redundant information is not limited to any particular character.

It should be noted that the dot is an upper case character. Therefore, if a new quotation follows the dot, there can be no detection of a new quotation by FF–228 of the display control, because there is no change of the state of FF–230 which is necessary to trigger FF–228 to enable the last-seven logic, as described above. This would arise, for example, if two dots had been displayed in SB–41 and SB–42, and a new quotation is supplied.

To overcome this, an inverter 432 inverts the low output from FF–426 on line 428 to a high output on 434, thereby setting FF–228 as though a new quotation is received, which is the normal occurrence following a series of dots. Thus, the 0-output line of flip-flop 228 goes low, enabling gate 226, the output of which is inverted by gate 232 to a low output which enables gate 206 to pass the pulses CPG–4' for the last-seven operation. Thus, the new quotation is started in the first module of the display board as described with reference to FIG. 4 rather than within the last seven modules.

Various types of logic modes may be utilized in place of the NOR logic described above, and various types of circuits may be used for the modules described above. Suitable forms of these are well known in the art. One set of electronic circuits which has been found appropriate for the purpose is described in the copending patent application, Ser. No. 149,913, filed Nov. 3, 1961. Transistor and diode circuits may be used throughout the logic.

Accordingly, a new and improved electronic display system is provided. It can be readily adapted to various sizes due to its modular construction, including the modularization of the commutator. In addition, redundant information can be readily edited out of the displayed information.

What is claimed is:

1. In an electronic display system using segmental character display devices, and including means for receiving input signals representing characters to be displayed and producing therefrom coded character signals suitable for said display devices, and means for producing character ready signals, the improvement which comprises (a) a display board including a plurality of said display devices for displaying successive characters, (b) respective display devices having associated therewith a storage means for storing said coded character signals for the segments of the display device and a bistable commutator register stage for controlling the storage of signals in the storage means and blanking thereof, (c) said coded character signals being supplied in common to the storage means of the plurality of display devices and selectively stored therein under the control of said register stages, (d) connections from each commutator register stage to the next preceding and succeeding stages to form a shift register, (e) a display control unit including means responsive to said character ready signals for supplying shift pulses to said shift register and means for steering the first stage thereof alternatively to storing and blanking states, (f) and sensing means associated with at least a predetermined number of intermediate stages and a later stage of said shift register for sensing the states of the corresponding commutator register stages, (g) said display control unit including means responsive to the sensing of blanking states at said intermediate stages for producing steering to the storing state, and means responsive to the sensing of a storing state at said later stage for changing the steering to the blanking state.

2. Apparatus according to claim 1 in which said characters form groups of related characters, and including means for recognizing the transition from one of said groups to the next, and sensing means associated with a predetermined plurality of later stages of said shift register for sensing the states of the corresponding stages, said display control unit including means responsive to a said transition and to the sensing of a blanking state in a stage of said plurality of later stages for shifting said blanking state through the remaining stages of the register.

3. Apparatus according to claim 2 including means responsive to said character ready signals for producing respective control pulses of predetermined duration, and a source of pulses adapted to produce a plurality of pulses during a said control pulse, said display control unit including means for utilizing pulses from said source to produce said shifting of the blanking state through the remaining stages of the register and to shift the blanking state into the input stages thereof during a said control pulse.

4. Apparatus according to claim 3 including means for inhibiting the supplying of said coded character signals to said storage means during said shifting of the blanking state through the remaining stages and into the input stages of the register.

5. Apparatus according to claim 4 in which said display control unit includes means responsive to the trailing edge of a said control pulse for producing a said shift pulse to store the corresponding character signals in a said storage means.

6. Apparatus according to claim 1 including means for recognizing a signal respresenting a predetermined character, and means responsive to a predetermined number of repetitions of the last-mentioned signal for inhibiting shifting of said shift register during further repetitions thereof.

7. Apparatus according to claim 2 for displaying stock market quotations and the like, a said group of related characters including an identification section and a quotation section, including pairs of upper and lower display devices arranged in horizontal alignment, a said storage means being adapted to store coded character signals for upper and lower display devices of a pair, means for recognizing characters to be displayed in said upper and lower display devices respectively and producing corresponding display control signals, and control means associated with said pairs of display devices, respectively, and responsive to said display control signals for controlling the actuation of the display devices.

8. In a system for displaying stock market quotations and the like having respective identification and quotation sections, said system using segmental character display devices and including means for receiving input signals representing characters to be displayed and producing therefrom respective parallel coded character signals suitable for the display devices, and means for producing character ready signals, the improvement which comprises (a) a display board including a plurality of pairs of said display devices arranged in upper and lower horizontal rows, (b) respective pairs of display devices having associated therewith a storage means for storing said parallel coded character signals for the segments of the display devices and a bistable commutator register stage for controlling the storage of signals in the storage means and blanking thereof, (c) said parallel coded character signals being supplied in common to the storage means of the plurality of pairs of display devices and selectively stored therein under the control of said register stages, (d) connections from each commutator register stage to the next preceding and succeeding stages to form a shift register, (e) a display control unit including means for supplying shift pulses to said shift register and means for steering the first stage thereof alternatively to storing and blanking states, (f) sensing means associated with a predetermined plurality of intermediate stages and a predetermined plurality of later stages of said shift register for sensing the stages thereof, (g) said display control unit including means responsive to the sensing of blanking states at said intermediate stages for producing steering to the storing state and means responsive to the sensing of storing states in said later stages for changing the steering to the blanking state, (h) means responsive to said character ready signals for producing respective control pulses of predetermined duration, (i) a source of pulses adapted to produce a plurality of pulses during a said control pulse, (j) means for recognizing the transition from one quotation to the next, (k) means in said display control unit responsive to a said transition and to the sensing of a blanking state in at least one of said later stages for supplying pulses from said source to shift said blanking state through the remaining stages of the register and to shift the blanking state into the input stages during a said control pulse, (l) means in the display control circuit responsive to the trailing edge of a said control pulse for producing a shift pulse to store the corresponding character signals in a said storage means, (m) means for recognizing characters to be displayed in said upper and lower display devices respectively and producing corresponding display control signals, (n) and control means associated with said pairs of display devices, respectively, and responsive to said display control signals for controlling the actuation of the display devices.

9. Apparatus according to claim 8 including means for inhibiting the supplying of said coded character signals to said storage means during said shifting of the blanking state through the remaining stages and into the input stages of the register.

References Cited

UNITED STATES PATENTS

| | | | |
|---|---|---|---|
| 2,871,462 | 1/1959 | Eggensperger et al. | 340—154 |
| 3,106,696 | 10/1963 | Foley | 340—154 |
| 3,201,515 | 8/1965 | Meisingset | 178—23 |

JOHN W. CALDWELL, *Primary Examiner.*

A. J. KASPER, *Assistant Examiner.*